US012620225B2

(12) United States Patent
Croitoru et al.

(10) Patent No.: US 12,620,225 B2
(45) Date of Patent: May 5, 2026

(54) SEGMENT IDENTIFICATION FROM LONG VIDEOS

(71) Applicant: ADOBE INC., San Jose, CA (US)

(72) Inventors: Ioana Croitoru, Bucharest (RO); Trung Huu Bui, San Jose, CA (US); Zhaowen Wang, San Jose, CA (US); Seunghyun Yoon, San Jose, CA (US); Franck Dernoncourt, Spokane, WA (US); Hailin Jin, San Jose, CA (US)

(73) Assignee: ADOBE INC., San Jose, CA (US)

( * ) Notice: Subject to any disclaimer, the term of this patent is extended or adjusted under 35 U.S.C. 154(b) by 336 days.

(21) Appl. No.: 18/305,587

(22) Filed: Apr. 24, 2023

(65) Prior Publication Data

US 2024/0355119 A1 Oct. 24, 2024

(51) Int. Cl.
*G06V 20/40* (2022.01)
*G06V 10/774* (2022.01)
(Continued)

(52) U.S. Cl.
CPC ............ *G06V 20/41* (2022.01); *G06V 10/774* (2022.01); *G06V 20/49* (2022.01); *G06V 20/70* (2022.01); *G10L 15/04* (2013.01); *G10L 15/1815* (2013.01); *G10L 15/22* (2013.01); *G10L 25/57* (2013.01); *G10L 15/16* (2013.01)

(58) Field of Classification Search
CPC ...... G06V 20/41; G06V 10/774; G06V 20/49; G06V 20/70; G06V 10/82; G06V 20/46; G06V 10/764; G06V 20/40; G06V 20/47; G06V 10/454; G06V 20/48; G10L 15/04;
G10L 15/1815; G10L 15/22; G10L 25/57; G10L 15/16; G10L 15/183; G06N 3/0464; G06N 3/09; G06N 3/045; G06N 3/08; G06N 3/0455; G06N 3/044; H04N 21/23418; H04N 21/8456; H04N 21/8549; H04N 21/26603; H04N 21/4394; H04N 21/44008; H04N 21/84; H04N 21/2353; G06F 16/7844
See application file for complete search history.

(56) References Cited

U.S. PATENT DOCUMENTS 10,311,913 B1 * 6/2019 Shekhar ................. G06V 20/41
10,860,860 B1 * 12/2020 Huynh .................. G06F 16/739
(Continued)

OTHER PUBLICATIONS

1 Brown, et al, "Language Models are Few-Shot Learners", arXiv preprint arXiv:2005.14165v1 [cs.CL] May 28, 2020, 72 pages.
(Continued)

*Primary Examiner* — Michael S Osinski
(74) *Attorney, Agent, or Firm* — F. CHAU & ASSOCIATES, LLC

(57) ABSTRACT

One or more aspects of the method, apparatus, and non-transitory computer readable medium include receiving a query relating to a long video. One or more aspects of the method, apparatus, and non-transitory computer readable medium further include generating a segment of the long video corresponding to the query using a machine learning model trained to identify relevant segments from long videos. One or more aspects of the method, apparatus, and non-transitory computer readable medium further include responding to the query based on the generated segment.

17 Claims, 10 Drawing Sheets

(51) Int. Cl.

| | |
|---|---|
| *G06V 20/70* | (2022.01) |
| *G10L 15/04* | (2013.01) |
| *G10L 15/16* | (2006.01) |
| *G10L 15/18* | (2013.01) |
| *G10L 15/22* | (2006.01) |
| *G10L 25/57* | (2013.01) |

(56) References Cited

U.S. PATENT DOCUMENTS

| | | | | |
|---|---|---|---|---|
| 11,176,411 | B2 * | 11/2021 | Sha | G06N 3/08 |
| 11,836,181 | B2 * | 12/2023 | Saggi | G06N 20/00 |
| 11,941,085 | B2 * | 3/2024 | Zhang | G06N 3/09 |
| 12,288,570 | B1 * | 4/2025 | Lyle | G06V 10/945 |
| 12,386,891 | B2 * | 8/2025 | Jiang | G06F 16/783 |
| 12,482,255 | B1 * | 11/2025 | Azad | G06F 18/24 |
| 2015/0082349 | A1 * | 3/2015 | Ishtiaq | H04N 21/4316 |
| | | | | 725/40 |
| 2016/0004911 | A1 * | 1/2016 | Cheng | H04N 21/233 |
| | | | | 382/159 |
| 2016/0247328 | A1 * | 8/2016 | Han | H04N 21/8549 |
| 2017/0357720 | A1 * | 12/2017 | Torabi | G06F 16/7844 |
| 2019/0188479 | A1 * | 6/2019 | Balasubramanian | G06T 7/251 |
| 2019/0378535 | A1 * | 12/2019 | Yuyama | H04S 7/00 |
| 2020/0013265 | A1 * | 1/2020 | Moloney | G06V 20/52 |
| 2020/0250537 | A1 * | 8/2020 | Li | G06N 3/0464 |
| 2020/0327160 | A1 * | 10/2020 | Hsieh | H04N 21/26603 |
| 2020/0364464 | A1 * | 11/2020 | Vijayanarasimhan | |
| | | | | G06V 20/30 |
| 2021/0004605 | A1 * | 1/2021 | Hsiao | G06F 16/7844 |
| 2021/0142069 | A1 * | 5/2021 | Chen | G06V 20/46 |
| 2021/0256059 | A1 * | 8/2021 | Gan | G06N 3/049 |
| 2021/0281774 | A1 * | 9/2021 | Pei | H04N 21/4884 |
| 2022/0092108 | A1 * | 3/2022 | Collomosse | G06F 16/535 |
| 2022/0129860 | A1 * | 4/2022 | Nvs | G10L 15/08 |
| 2022/0138473 | A1 * | 5/2022 | Kwatra | G06V 10/82 |
| | | | | 382/190 |
| 2022/0253715 | A1 * | 8/2022 | Ray | G06V 20/62 |
| 2022/0342927 | A1 * | 10/2022 | Marfoq | G06F 18/2415 |
| 2022/0343626 | A1 * | 10/2022 | Gong | G06V 30/413 |
| 2022/0351516 | A1 * | 11/2022 | Vijayanarasimhan | |
| | | | | G06V 20/41 |
| 2023/0300430 | A1 * | 9/2023 | Mishra | G11B 27/34 |
| 2023/0306056 | A1 * | 9/2023 | Lee | G06V 20/49 |
| 2024/0037948 | A1 * | 2/2024 | Chen | G06V 10/761 |
| 2024/0046074 | A1 * | 2/2024 | Lewis | G10L 15/18 |
| 2024/0127415 | A1 * | 4/2024 | Lim | G06V 10/44 |
| 2024/0169732 | A1 * | 5/2024 | Dvornik | G06V 20/48 |
| 2024/0314406 | A1 * | 9/2024 | Meier | G06N 20/00 |
| 2024/0404283 | A1 * | 12/2024 | Wang | G06V 10/776 |
| 2025/0005918 | A1 * | 1/2025 | Willmott | G06V 10/86 |
| 2025/0118338 | A1 * | 4/2025 | Sun | G06V 20/62 |
| 2025/0131718 | A1 * | 4/2025 | Ma | G06V 20/44 |
| 2025/0258864 | A1 * | 8/2025 | Park | G06V 10/82 |
| 2025/0272206 | A1 * | 8/2025 | Kwon | G06V 10/776 |

OTHER PUBLICATIONS

2Brown, et al, "Language Models are Few-Shot Learners", arXiv preprint arXiv:2005.14165v4 [cs.CL] Jul. 22, 2020, 75 pages.

3Carion, et al, "End-to-End Object Detection with Transformers", arXiv preprint arXiv:2005.12872v1 [cs.CV] May 26, 2020, 26 pages.

4Carion, et al, "End-to-End Object Detection with Transformers", arXiv preprint arXiv:2005.12872v3 [cs.CV] May 28, 2020, 26 pages.

5Cho, et al, "StreamHover: Livestream Transcript Summarization and Annotation", arXiv preprint arXiv:2109.05160v1 [cs.CL] Sep. 11, 2021, 18 pages.

6Escorcia, et al, "Temporal Localization of Moments in Video Collections with Natural Language", arXiv preprint arXiv:1907.12763v1 [cs.CV] Jul. 30, 2019, 14 pages.

7Escorcia, et al, "Finding Moments in Video Collections Using Natural Language", arXiv preprint arXiv:1907.12763v2 [cs.CV] Feb. 23, 2022, 17 pages.

8Gao, et al. "TALL: Temporal Activity Localization via Language Query", arXiv preprint arXiv:1705.02101v2 [cs.CV] Aug. 3, 2017, 10 pages.

9Hendricks, et al. "Localizing Moments in Video with Natural Language", arXiv preprint arXiv:1708.01641v1 [cs.CV] Aug. 4, 2017, 20 pages.

10Jung, et al, "Modal-specific Pseudo Query Generation for Video Corpus Moment Retrieval", arXiv preprint arXiv:2210.12617v1 [cs.CL] Oct. 23, 2022, 13 pages.

11Kamath, et al, "MDETR—Modulated Detection for End-to-End Multi-Modal Understanding", arXiv preprint arXiv:2104.12763v2 [cs.CV] Oct. 12, 2021, 22 pages.

12Kanafani, et al, "Unsupervised Video Summarization via Multi-source Features", arXiv preprint arXiv:2105.12532v1 [cs.CV] May 26, 2021, 5 pages.

13Krishna, et al, "Dense-Captioning Events in Videos", arXiv preprint arXiv:1705.00754v1 [cs.CV] May 2, 2017, 16 pages.

14Lei, et al, "QVHIGHLIGHTS: Detecting Moments and Highlights in Videos via Natural Language Queries", arXiv preprint arXiv:2107.09609v1 [cs.CV] Jul. 20, 2021, 17 pages.

15Lei, et al, "QVHIGHLIGHTS: Detecting Moments and Highlights in Videos via Natural Language Queries", arXiv preprint arXiv:2107.09609v2 [cs.CV] Nov. 29, 2021, 18 pages.

16Lei, et al, "TVQA+: Spatio-Temporal Grounding for Video Question Answering", arXiv preprint arXiv:1904.11574v2 [cs.CV] May 11, 2020, 15 pages.

17Lei, et al, "TVR: A Large-Scale Dataset for Video-Subtitle Moment Retrieval", arXiv preprint arXiv:2001.09099v2 [cs.CV] Aug. 18, 2020, 35 pages.

18Liu, et al, "UMT: Unified Multi-modal Transformers for Joint Video Moment Retrieval and Highlight Detection", arXiv preprint arXiv:2203.12745v2 [cs.CV] Mar. 27, 2022, 13 pages.

19Meyes, et al, "Ablation Studies in Artificial Neural Networks", arXiv preprint arXiv:1901.08644v2 [cs.NE] Feb. 18, 2019, 19 pages.

20Nam, et al, "Zero-shot Natural Language Video Localization", arXiv preprint arXiv:2110.00428 Aug. 29, 2021, 10 pages.

21Qiu, et al, "LiveSeg: Unsupervised Multimodal Temporal Segmentation of Long Livestream Videos", arXiv preprint arXiv:2210.05840v1 [cs.CV] Oct. 12, 2022, 11 pages.

22Radford, et al, "Learning Transferable Visual Models From Natural Language Supervision", arXiv preprint arXiv:2103.00020v1 [cs.CV] Feb. 26, 2021, 48 pages.

23Rotman, et al, "Learnable Optimal Sequential Grouping for Video Scene Detection," arXiv preprint arXiv:2205.08249v1 [cs.CV] May 17, 2022, 17 pages.

24Rotman, et al, "Optimally Grouped Deep Features Using Normalized Cost for Video Scene Detection," ICMR'18: Proceedings of the 2018 ACM International Conference on Multimedia, Yokohama, Japan, pp. 187-195, https://doi.org/10.1145/3206025.3206055, Jun. 11-14, 2018, 9 pages.

25Rotman, et al, "Robust and Efficient Video Scene Detection Using Optimal Sequential Grouping," 2016 IEEE International Symposium on Multimedia, San Jose, CA, USA, pp. 275-280, doi: 10.1109/ISM.2016.0061., Dec. 11-13, 2016, 6 pages.

26Wang, et al, "Residual Attention Network for Image Classification", arXiv preprint arXiv:1704.06904v1 [cs.CV] Apr. 23, 2017, 9 pages.

27Xu, et al, "Multilevel Language and Vision Integration for Text-to-Clip Retrieval", arXiv preprint arXiv:1804.05113v3 [cs.CV] Dec. 25, 2018, 9 pages.

28Zeiler, et al, "Visualizing and Understanding Convolutional Networks", arXiv preprint arXiv:1311.2901v3 [cs.CV] Nov. 28, 2013, 11 pages.

29Zhang, et al, "MAN: Moment Alignment Network for Natural Language Moment Retrieval via Iterative Graph Adjustment", arXiv preprint arXiv:1812.00087v2 [cs.CV] May 17, 2019, 11 pages.

(56) References Cited

OTHER PUBLICATIONS

30Zhang, et al, "Span-based Localizing Network for Natural Language Video Localization", arXiv preprint arXiv:2004.13931v2 [cs.CL] Jun. 14, 2020, 12 pages.

* cited by examiner

110

300

130

310

305

PROVIDE A QUERY AND/OR VIDEO FOR ANALYSIS

320    OBTAIN THE VIDEO

330    AUTOMATICALLY GENERATE TRANSCRIPT FROM AUDIO USING SPEECH RECOGNITION

340    ASSOCIATE TRANSCRIPT TOPIC(S) WITH VIDEO SEGMENT(S)

350    EXTRACT VIDEO SEGMENTS BASED ON IDENTIFIED TRANSCRIPT TOPICS AND QUERY

370

360    PRESENT THE EXTRACTED VIDEO SEGMENT(S) TO THE USER

410 — OBTAIN LONG VIDEO

420 — GENERATE A TRANSCRIPT FOR THE LONG VIDEO

430 — FRAGMENT THE LONG VIDEO INTO VIDEO SEGMENTS

440 — CONCATENATE THE TRANSCRIPT FOR EACH OF THE VIDEO SEGMENTS

450 — GENERATE A QUERY FOR EACH OF THE VIDEO SEGMENTS

460 — FILTER THE VIDEO SEGMENTS AND QUERIES BASED ON SIMILARITY MEASUREMENTS

470 — PROVIDE START TIME AND END TIME OF RELEVANT VIDEO SEGMENT

610    RECEIVE CONCATENATED VIDEO AND TEXT

620    EXTRACT VIDEO FEATURES FROM VIDEO FRAMES

630    EXTRACT TEXT FEATURES FROM THE ASSOCIATED QUERY

640    INPUT THE VIDEO FEATURES AND TEXT FEATURES TO THE MODEL FOR TRAINING

650    GENERATE PREDICTED OUTPUT TIMES

660    CALCULATE A LOSS BETWEEN THE OUTPUT TIMES AND THE GROUND TRUTH TIMES

670    UPDATE THE MODEL BASED ON THE CALCULATED LOSS

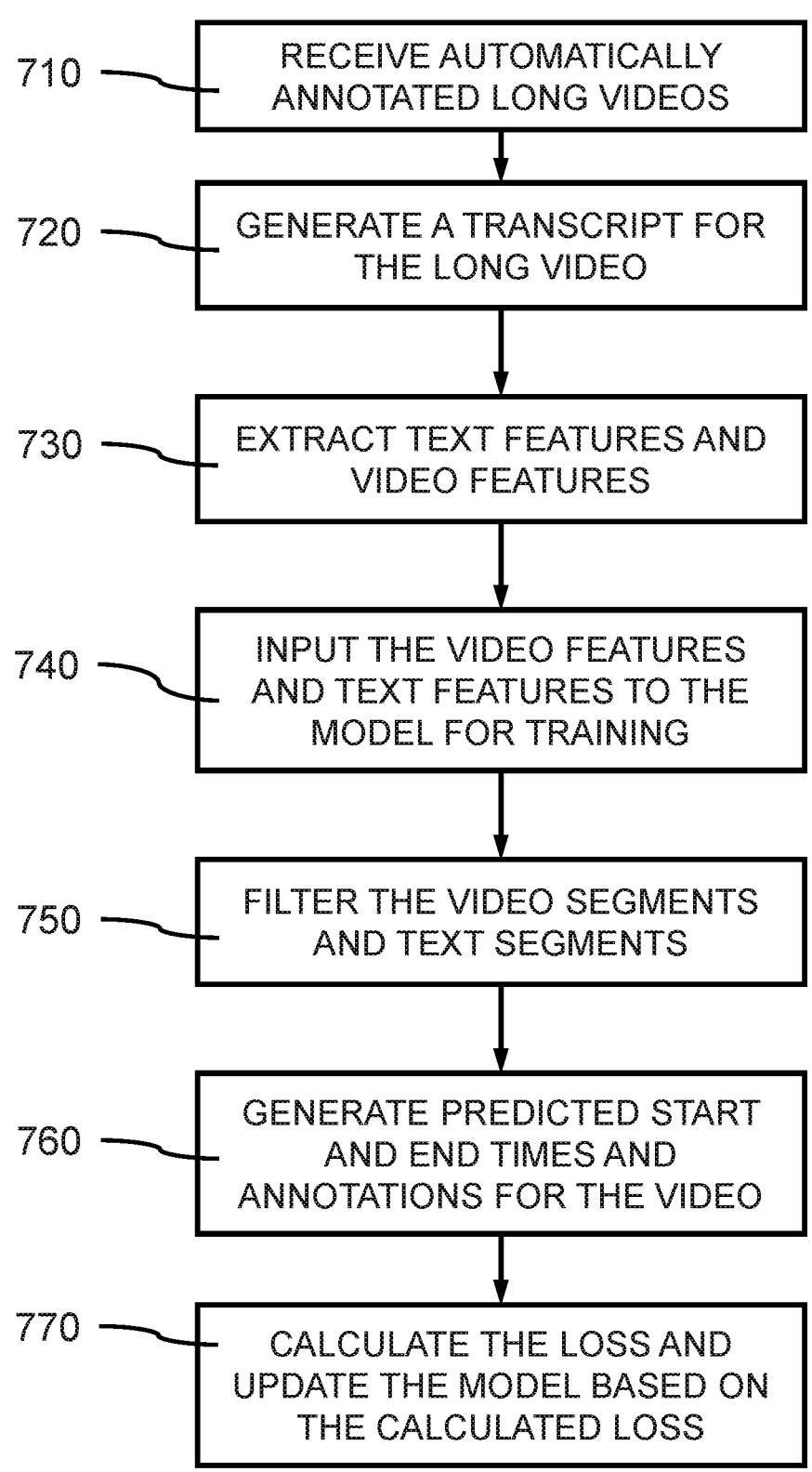

710 — RECEIVE AUTOMATICALLY ANNOTATED LONG VIDEOS

720 — GENERATE A TRANSCRIPT FOR THE LONG VIDEO

730 — EXTRACT TEXT FEATURES AND VIDEO FEATURES

740 — INPUT THE VIDEO FEATURES AND TEXT FEATURES TO THE MODEL FOR TRAINING

750 — FILTER THE VIDEO SEGMENTS AND TEXT SEGMENTS

760 — GENERATE PREDICTED START AND END TIMES AND ANNOTATIONS FOR THE VIDEO

770 — CALCULATE THE LOSS AND UPDATE THE MODEL BASED ON THE CALCULATED LOSS

FIG. 7

810 — RECEIVE A QUERY RELATING TO A LONG VIDEO

820 — AUTOMATICALLY GENERATE A SEGMENT OF THE LONG VIDEO CORRESPONDING TO THE QUERY

830 — RESPOND TO THE QUERY BASED ON THE GENERATED SEGMENT

910 — OBTAIN A PLURALITY OF VIDEO SEGMENTS

920 — COMBINING A SUBSET OF PLURALITY OF VIDEO SEGMENTS

930 — TRAINING A MACHINE LEARNING MODEL TO IDENTIFY A SEGMENT FROM A LONG VIDEO BASED ON A QUERY

SEGMENT IDENTIFICATION FROM LONG VIDEOS

BACKGROUND

The present disclosure relates generally to image processing and, in some embodiments, to identifying portions of a video relating to a user query.

Videos provide a major source of information online, and the amount of video content continues to grow. Many videos are long videos that last more than an hour. In some cases, it is useful to search and find particular segments of long videos that relate to subject matter of interest.

SUMMARY

Embodiments of the present disclosure provide a machine learning model utilizing natural language processing to analyze a user query and identify a video segment relating to the user query from a long video. The long video can be segmented based on transcripts generated from an audio track of the long video through automatic speech recognition using a trained neural network.

A method, apparatus, and non-transitory computer readable medium for identifying a video segment relating to a user query are described. One or more aspects of the method, apparatus, and non-transitory computer readable medium include receiving a query relating to a long video. One or more aspects of the method, apparatus, and non-transitory computer readable medium further include generating a segment of the long video corresponding to the query using a machine learning model trained to identify relevant segments from long videos. One or more aspects of the method, apparatus, and non-transitory computer readable medium further include responding to the query based on the generated segment.

A method, apparatus, and non-transitory computer readable medium for identifying a video segment relating to a user query are described. One or more aspects of the method, apparatus, and non-transitory computer readable medium include one or more processors and one or more memories including instructions executable by the one or more processors to generate a segment of a long video corresponding to a query based on a machine learning model trained to identify relevant segments from long videos.

A method, apparatus, and non-transitory computer readable medium for a method of training a machine learning model are described. One or more aspects of the method, apparatus, and non-transitory computer readable medium include obtaining a plurality of video segments. One or more aspects of the method, apparatus, and non-transitory computer readable medium further include combining a subset of the plurality of video segments to obtain a combined video segment. One or more aspects of the method, apparatus, and non-transitory computer readable medium further include training the machine learning model to identify a segment from a long video based on a query, wherein the training is based on training data including the combined video segment.

BRIEF DESCRIPTION OF THE DRAWINGS

FIG. 7 shows a block/flow diagram of an example of a method of training an automatic annotation component, according to aspects of the present disclosure.

DETAILED DESCRIPTION

The present disclosure relates generally to image processing, and in some embodiments, to identifying relevant video segments in a video (i.e., moment detection). In some cases, video segments are identified based on a query from a user. Moment detection for a video involves localizing the moment of interest described by an input query. Being able to find a video segment of interest in videos that can be hours long has a broad range of applications from security to entertainment.

A method for moment detection is described. One or more aspects of the method include receiving a query relating to a long video, generating a segment of the long video corresponding to the query using a machine learning model trained to identify relevant segments from long videos, and responding to the query based on the generated segment.

In various embodiments a transformer encoder-decoder architecture can be trained and used to predict the start and end time of the segment based on the input query. A machine learning model can be utilized to identify video-text pairs that are relevant to a user query.

Accordingly, embodiments of the disclosure improve on moment detection and provide efficient searching within long videos through automatic speech recognition and video segmentation. Being able to accurately localize a desired segment in a long video can improve the user experience by facilitating faster video navigation. Moment detection facilitates easy rewatching or skipping to the desired content in the video. In addition, a training set of long videos can be generated by automatic annotation using the ASR and generated transcripts with pretrained large language models. This also allows high-quality queries for identifying the video segments. Because the time and financial cost of collecting manual annotations for thousands of videos is high, automatic annotation is an effective way of decreasing these costs.

Network Architecture

One or more aspects of the apparatus and method include one or more processors; a memory coupled to and in communication with the one or more processors, wherein the memory includes instructions executable by the one or more processors to perform operations including: generating a segment of a long video corresponding to a query based on a machine learning model trained to identify relevant segments from long videos.

In various embodiments, a transformer encoder-decoder architecture can be used to predict the start time and end time of a video segment based on an input query, where the transformer encoder-decoder architecture can include a Moment Detection Transformer (Moment-DETR) architecture. The meta-parameters of the Moment-DETR architecture are adjusted for use on longer videos. The video search model can receive as input a concatenation of the video and text features, and output the center and width of the predicted moment, which can be used to generate a video segment.

Figure 1:
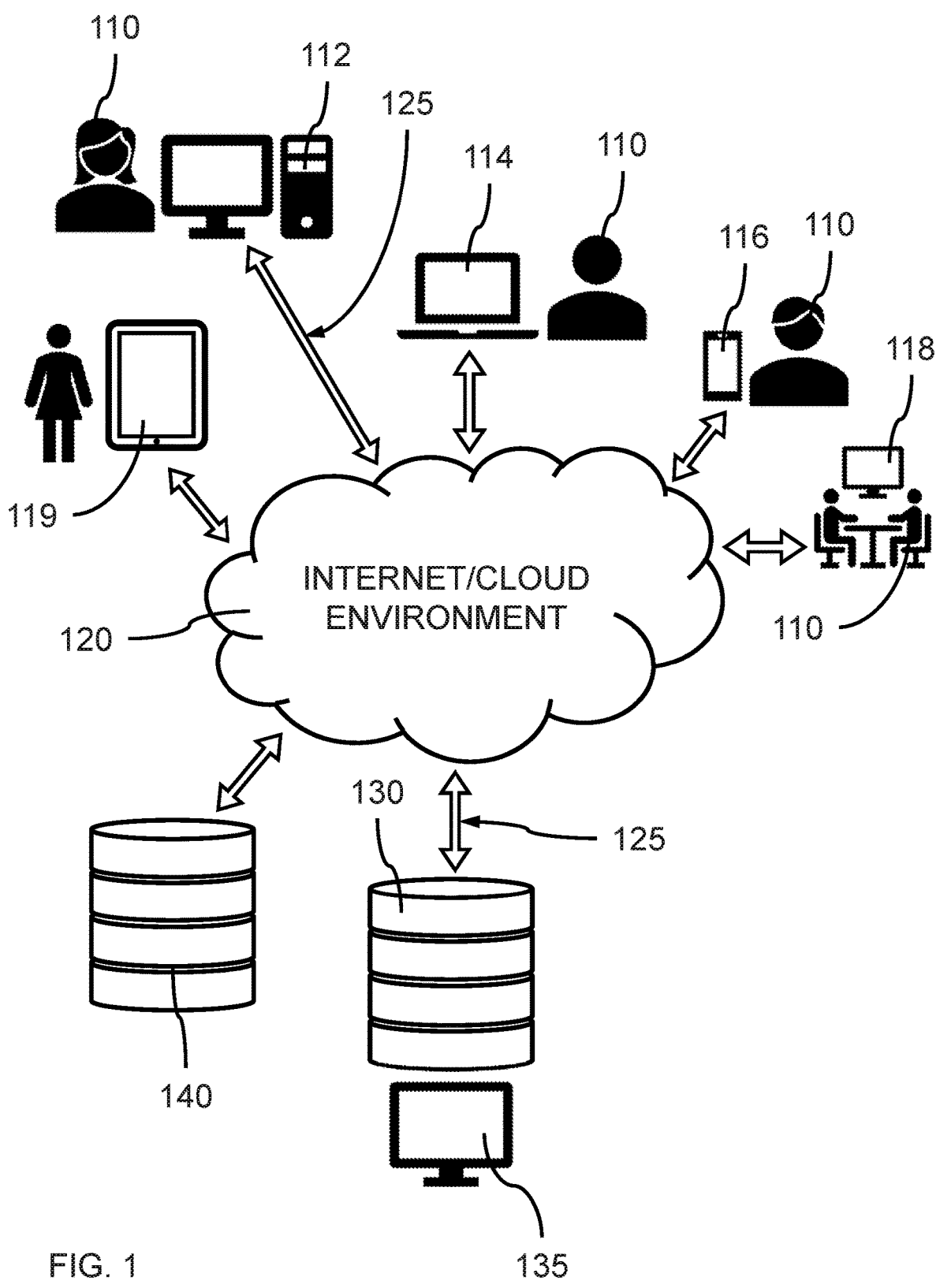
FIG. 1 is an illustrative depiction of a high-level diagram of users interacting with a video segment identification system, including a neural network for generating video transcripts, and receiving user queries through remote devices, according to aspects of the present disclosure.

FIG. 1 is an illustrative depiction of a high-level diagram of users interacting with a video segment identification system, including a neural network for generating video transcripts, and receiving user queries through remote devices, according to aspects of the present disclosure.

In various embodiments, a video segment identification system 130 can involve a user 110 who can interact with video segment identification system software on user devices 112, 114, 116, 118, and 119. A user 110 may interact with the video segment identification system 130 using, for example, a desktop computer 112, a laptop computer 114, a handheld mobile device 116, for example, a smart phone, a tablet 119, a smart tv 118, a tablet 119, or other suitably configured user device. The user device can communicate 125 with the video segment identification apparatus 130, which can be a server located on the cloud 120. The video segment identification apparatus 130 can generate video segments in response to a user query, where the user requests identification of a portion of a long video.

Embodiments of the disclosure can be implemented in a server operating from the cloud 120, where the cloud is a computer network configured to provide on-demand availability of computer system resources, such as data storage and computing power. In some examples, the cloud 120 provides resources without active management by the user 110. The term cloud is sometimes used to describe data centers available to many users over the Internet. Some large cloud networks have functions distributed over multiple locations from central servers. A server is designated an edge server if the server has a direct or close connection to a user. In some cases, a cloud 120 is limited to a single organization. In other examples, the cloud 120 is available to many organizations. In an example, a cloud 120 includes a multi-layer communications network comprising multiple edge routers and core routers. In another example, a cloud 120 is based on a local collection of switches in a single physical location.

In various embodiments, the functions of the video segment identification apparatus 120 can be located on or performed by the user device 110. Videos and other resources for video segment identification can be stored on a database 140. User device 110 may be a personal computer, laptop computer, mainframe computer, palmtop computer, personal assistant, mobile device, or any other suitable processing apparatus. In various embodiments, a user device includes software that incorporates a video segment identification application. In some examples, the video segment identification application on user device may include functions of video segment identification apparatus 130.

In various embodiments, a user interface may enable user 110 to interact with the user device. In some embodiments, the user interface may include an audio device, such as an external speaker system, an external display device such as a display screen, and/or an input device (e.g., remote control device interfaced with the user interface directly or through an I/O controller module). In various embodiments, a user interface may be a graphical user interface (GUI). In various embodiments, a user interface may be represented in code which is sent to the user device and rendered locally by a browser.

In various embodiments, a video segment identification apparatus 130 can include a computer implemented network comprising a user interface, a machine learning model, which can include a natural language processing (NLP) model and an automatic speech recognition model. The video segment identification apparatus 120 can also include a processor unit, a memory unit, a transformer/encoder, and a training component. The training component can be used to train one or more machine learning models. Additionally, video segment identification apparatus 120 can communicate with a database 140 via cloud 130. In some cases, the architecture of the neural network is also referred to as a network or a network model. The neural network model can be trained to identify one or more video segments based on a user query using a neural network training technique.

In various embodiments, transformer/encoder can generate a vector representing the description converted from the user's natural language text input. The description can include text indicating features of a video to be searched for.

In various embodiments, video segment identification apparatus 130 is implemented on a server. A server provides one or more functions to users linked by way of one or more networks. In some cases, the server can include a single microprocessor board, which includes a microprocessor responsible for controlling aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 120 can be a computer network configured to provide on-demand availability of computer system resources, such as data storage and computing power. In some examples, cloud 120 provides resources without active management by user 110. The term "cloud" is sometimes used to describe data centers available to many users (e.g., user 110) over the Internet. Some large cloud networks have functions distributed over multiple locations from central servers. A server is designated an edge server if the server has a direct or close connection to a user (e.g., user 110). In some cases, cloud 120 is limited to a single organization. In other examples, cloud 120 is available to many organizations. In an example, cloud 120 includes a multi-layer communications network comprising multiple edge routers and core routers. In another example, cloud 120 is based on a local collection of switches in a single physical location.

A database 140 is an organized collection of data, where for example, database 140 can store data in a specified format known as a schema. Database 140 may be structured as a single database, a distributed database, multiple distributed databases, or an emergency backup database. In some cases, a database controller may manage data storage and processing in database 140. In some cases, a user 105 interacts with the database controller. In other cases, a database controller may operate automatically without user interaction.

Figure 2:
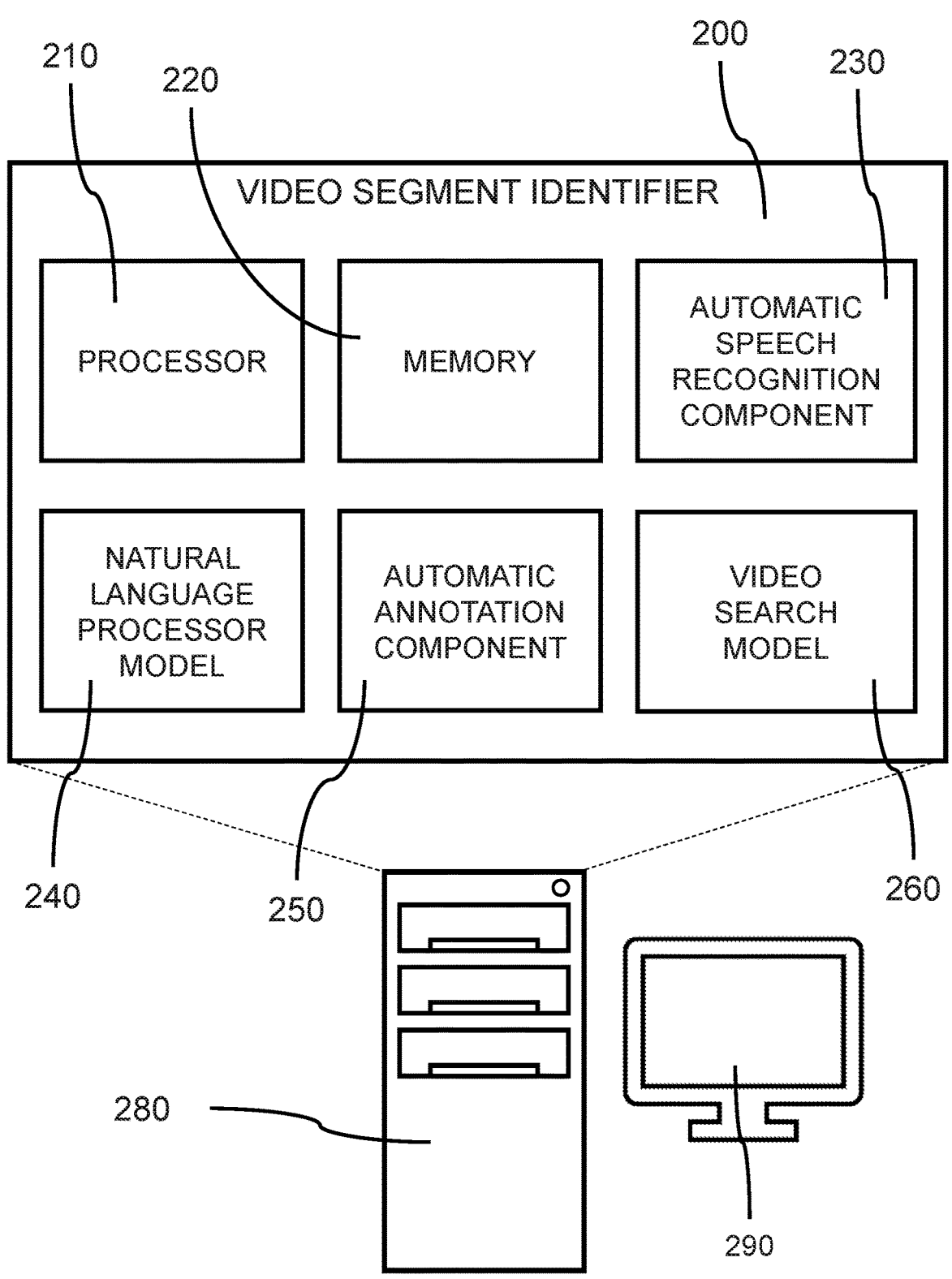
FIG. 2 shows a block diagram of an example of a video segment identifier according to aspects of the present disclosure.

FIG. 2 shows a block diagram of an example of a video segment identifier according to aspects of the present disclosure.

In various embodiments, a video segment identifier 200 receives an original video including an audio track and original video content, where the original video can be a long video having a length of one hour or greater. The original video may be stored in computer memory 220 of the video segment identifier 200.

In various embodiments, the video segment identifier 200 can include a computer system 280 including one or more processors 210, computer memory 220, an automatic speech recognition component 230, a natural language processing component 240, an automatic annotation component 250, and a video search model 260. The computer system 280 of the video segment identifier 200 can be operatively coupled to a display device 290 (e.g., computer screen) for presenting prompts and images to a user 110, and operatively coupled to input devices to receive input from the user, including the original video(s).

According to some aspects, automatic speech recognition (ASR) component 230 can perform speech detection and recognition using a computational model that determines what words are vocalized in an audio signal, where automatic speech recognition can convert spoken language, as an audio signal, into written text. Automatic speech recognition can utilize NLP to augment generated transcripts with punctuation and capitalization.

In various embodiments, the natural language processing (NLP) model 240 can receive and analyze a query provided by a user, and provide a transcript generated by the ASR component 230. The natural language processing (NLP) model can be trained and used to interpret a user query and identify a video segment containing context requested by the user.

In various embodiments, the automatic annotation component 250 can combine the outputs of the automatic speech recognition (ASR) component 230 and the natural language processing (NLP) model 240 to automatically generate a transcript of the audio track of a video and apply the transcript to the video component of the video as annotation of the activities occurring in the scenes of the video. The annotation can be added to the video to provide labels for the events occurring within the video scenes. The use of ASR can reduce or eliminate the use of human annotated labels for training and/or video segment identification. Instead, weak supervision from video transcripts can be leveraged.

In various embodiments, the video search model 260 can be a deep neural network model that can be trained and used to identify segments of the video that correlate with the user query.

Figure 3:
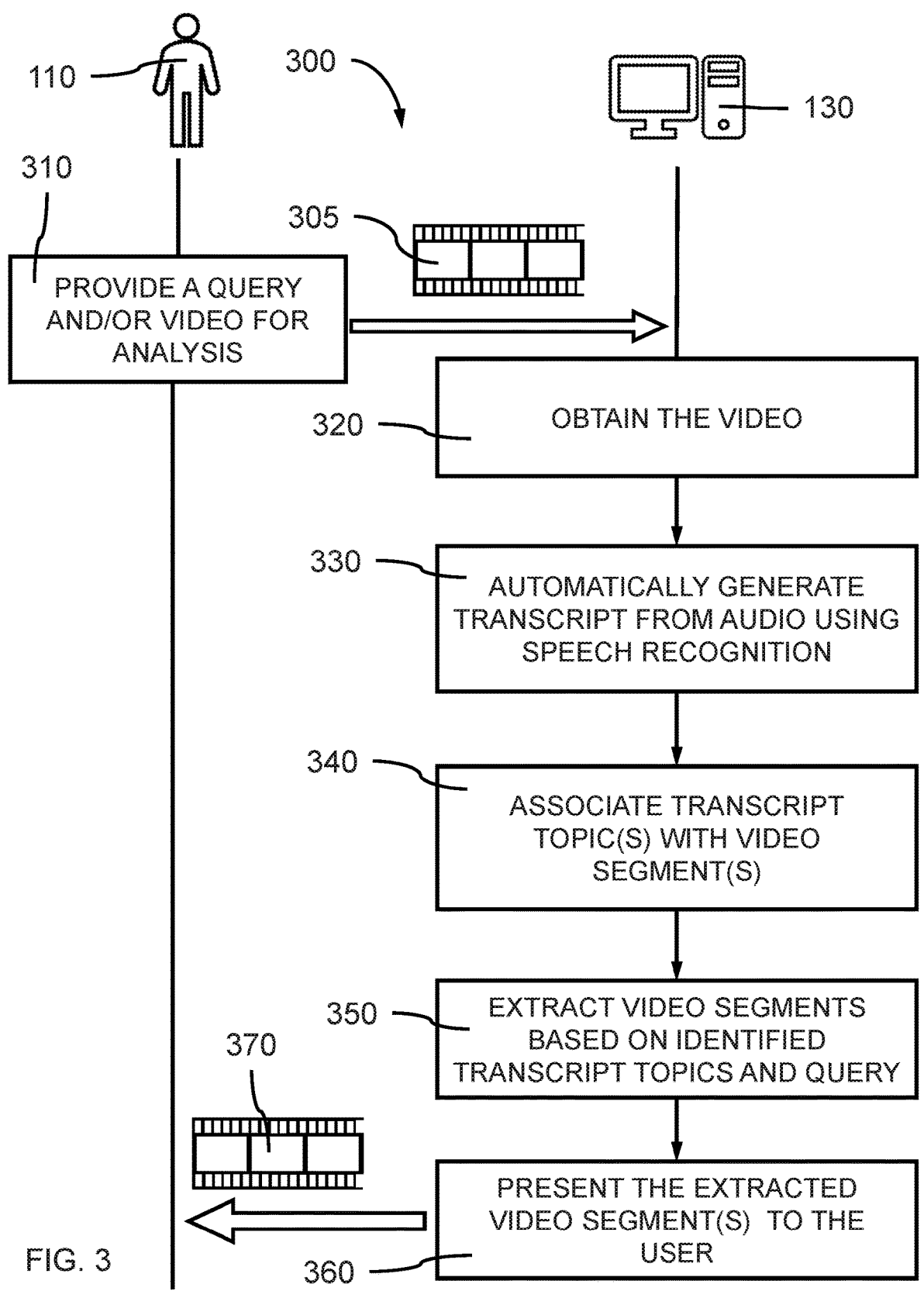
FIG. 3 shows a flow diagram illustrating an example of video segment identification using a video segment identification system and methods, according to aspects of the present disclosure.

FIG. 3 shows a flow diagram illustrating an example of video segment identification using a video segment identification system and methods, according to aspects of the present disclosure.

At operation 310, a user can provide a query regarding a video 305 to a video segment identification system 130, where the query can identify video content to be identified in the video 305. The query can be a natural language query, as would be spoken or used normally by the user.

In various embodiments, a user can provide an original video 305 to a video segment identification system 130, where a video can be communicated from a user to the video segment identification system 130.

At operation 320, the video segment identification system 130 can obtain the video 305 from the user or from a database based on a specification by the user, for example, the query may include the name of a video, where the video may be available on a database, without the user uploading the specific video to the video segment identification system 130. The video segment identification system 130 may obtain the video 305 from the user 110, where the user 110 uploads the video from a source available to the user or from local storage on a user devise 112, 114, 116, 118, 119.

At operation 330, a transcript can be generated by the video segment identification system 130, where the transcript can be generated from the audio track of the video using automatic speech recognition. The transcript can include the detectable words spoken by a character or presenter in the video translated into text. In various embodiments, a natural language processing component 240 can analyze the transcript to improve the interpretation of the content of the transcript, where the natural language processing component 240 can identify topics and descriptions discussed in the audio track. The transcript text can be used to annotate the video.

At operation 340, identified topics and descriptions in the transcript can be associated with portions of the original video, where the portions of the video can include scenes associated with identified topic(s). The automatic annotation component 250 may associate identified topics and descriptions in the transcript with portions of the video. The automatic annotation component 250 may be trained to identify whether or not a portion of a video contains visual content related to transcript topics or descriptions. For example, during a video portion, a presenter my digress and discuss other topics or personal information, such as the weather, a pet, or a child, that is unrelated to the visual material and context of the video portion being displayed at the same time. The automatic annotation component 250 may determine that the topic(s) in the transcript are unrelated to the visual objects present in the video at the concurrent time.

At operation 350, the video portions that are identified as relating to the topics requested by the user in the query and identified in the transcript can be extracted from the original video 305 to generate a video segment 370. A video segment can be identified by a start time and an end time, where, for example, a start time may be identified by the initial reference to a topic in the associated transcript concurrently with the video displaying objects or scenes related to the topic, whereas the end time may be identified by the objects or scenes used for identifying the start time no longer appearing in the video. The reappearance of the objects or scenes relating to the query topic can cause another video segment having different start and end times to be identified. The video segment(s) 370 having the identified start and end time(s) can be generated from the original video 305.

For example, a presenter demonstrating how to draw a bear may begin a video by describing that a particular type of bear is to be illustrated. The automatic speech recognition component 230 may generate a transcript of the discussion, and the natural language processing component 240 may determine that the context of the video was a visual rendering (i.e., a drawing/illustration) of a bear being produced, in contrast to a bear drawing a salmon from a stream or a gun from a holster. The initial mentioning of the bear in the transcript with an object of a bear being presented on the screen can trigger identification of a start time. The presenter may discuss other topics while the object of the bear is shown in the video, indicating that the video segment is continuing. At a subsequent time, the disappearance of the object of the bear from the video may be detected by the video search model 260 indicating an end time of the "bear" video segment. The start time and the end time can be associated with the video and stored with the video segment as metadata.

At operation 360, the video segment(s) 370 extracted from the original video 305 can be presented to the user 110, where the video segment(s) 370 can be communicated from the video segment identification apparatus 130 to the user device 112, 114, 116, 118, 119.

Figure 4:
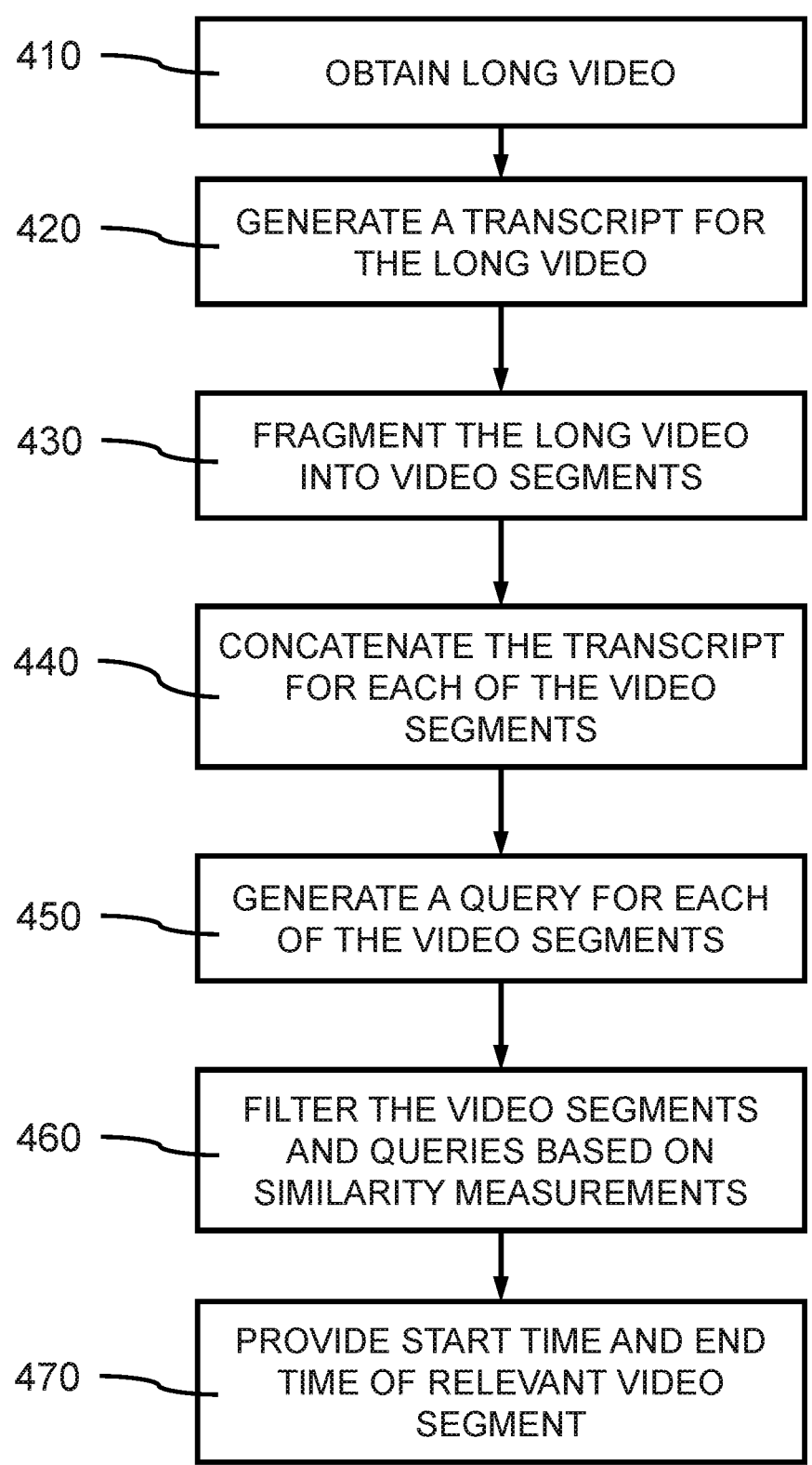
FIG. 4 shows a flow diagram of a method for generating annotations for a video, according to aspects of the present disclosure.

FIG. 4 shows a flow diagram of a method for generating annotations for a video, according to aspects of the present disclosure.

Given a video $v=\{f_1, f_2, \ldots, f_v\}$; where $f_i$ represents the i-th frame of the video, and a query, q, in natural language, moment detection can find a pair (i, j), i<j, where a video segment starting at $f_i$ and finishing at $f_j$ is best described by the natural language query, q. A video search model that receives a long video, v, and a natural language query from a user as input can be trained to provide a start time and end time of the relevant video segment as output.

Let $D=\{v_l | l=1 \ldots N\}$ be a dataset of N videos with segment annotations:

$$A = \bigcup_{l=1}^{N} A_l;$$

where $A_l=\{(q_k, (i_k, j_k)) | f_{ik}, f_{jk} \in v_l, i_k < j_k, k=1 \ldots Q_l\}$ denotes the segment annotations for video vi.

At operation 410, a long video can be obtained, for example, from a database of videos, where the long video can have a time duration of at least one hour. The long video can be composed of a plurality of video frames depicting a video image having one or more features. The long video can have a start time and an end time, and the video frames can have an associated time stamp between the start and end times of the long video. The long video can be without initial annotations.

In various embodiments, the videos can be obtained from, for example, the Behance platform, where Behance Livestream is a platform for creative users who share their work. The Behance Livestream videos can be long tutorial videos of high quality with relatively little noise. The Behance videos are livestreamed, the host interacts with the viewers and verbally explains the steps involved in a creative process. These tutorial video livestreams are usually long, with a majority being over one hour long. There are thousands of long tutorial videos available on Behance, and there are thousands more on other video platforms such as YouTube, which can directly benefit from moment detection in long videos.

At operation 420, a transcript can be generated from the audio track of the long video, where the transcript can be generated using automatic speech recognition (e.g., Azure ASR tool). For a video, $v_l$, a transcript, $s_l$, can be generated by ASR.

At operation 430, the long video can be fragmented into a plurality of video segments, $T_l$, where the long video can be randomly fragmented into segments having time durations of about 10 minutes (min.) to about 60 min., or about 800 second to about 3000 seconds, or about 1,200 seconds (20 min.) to about 2,700 seconds (45 min.), although other durations are also contemplated. For example, a random duration can be chosen for the first segment, where the duration of the first segment may be between 800 and 3000 seconds, and subsequent segments having random durations different from the first segment can be selected for the rest of the video until the end of the long video is reached. Based upon a random duration length, about 4 to 7 non-overlapping video segments may be generated from a long video depending on the initial length of the long video and the range of random durations.

In various embodiments, the videos are split into several segments representing different parts of the video, where the context and subject matter of the different parts may be distinguished from one another.

At operation 440, the portions of the transcript text coinciding with the random duration video segments can be concatenated to form an associated transcript segment. The timings for the segments can be used to identify the corresponding transcript portion within the video segment timespan, where identified portions of the transcript that is between $i_k$ and $j_k$ can be concatenated and act as the query for that associated segment.

In various embodiments, the concatenated transcript, $q_k$, can be added to the set of annotations, $A_l$, for video $v_l$. $A_l=\{(q_k, (i_k, j_k)) | f_{ik}, f_{jk} \in v_l, i_k < j_k, k=1 \ldots Q_l\}$; where $Q_l$ represents the number of segments in $v_l$, while $q_k$ represents the query written in natural language for the segment starting at $i_k$ and finishing at $j_k$, and the query, $q_k$, can be generated from the concatenated transcript. The symbol $q_k$ represents concatenated transcript $((i_k, j_k), s_l)$, from transcript $s_l$ for video $v_l$, where the video segment and transcript segment start at $i_k$ and end at $j_k$.

At operation 450, a query can be generated for each of the video segments starting at $i_k$ and finishing at $j_k$, where the video segments starting at $f_i$ and finishing at $f_j$ can be generated by random partitioning. The queries can be added to the set of annotations for the long video, where each query can be associated with a segment of the long video.

At operation 460, the video segments and queries can be filtered to remove portions of the video and transcript text that do not indicate corresponding subject matter. If a query is related to the visual content of a video frame, then the query text-video segment pair can be retained because the text in the query is visually grounded in the segment, and may be added to a set of filtered annotations, $A_{filtered}$, otherwise the query text-video segment pair may be discarded.

While parts of the transcripts can be extremely informative regarding what is happening in the video, there can also be a lot of noise, which includes redundant information or information that is irrelevant to the tutorial video context (for example chit-chat about events that happened lately). In various embodiments a filtering mechanism based on CLIP similarities can be used in order to select only good pseudo-segments for training.

In various embodiments, for each text-video segment that is formed by randomly splitting the video in subparts, a text embedding matrix can be calculated and a frames embedding matrix can be calculated. The text embedding matrix can be calculated by splitting the query from the transcript into sentences and extracting the CLIP embedding for each sentence from the query. The frames embedding matrix can be calculated by extracting the CLIP embedding for each video frame from the video segment. The matrices can be multiplied and a maximum similarity calculated. The maximum similarity can be compared to a predefined threshold and if the maximum similarity is below the threshold, the segment can be discarded and it is not used for training. CLIP is trained to predict which of the N×N possible (image, text) pairings across a batch actually occurred.

In various embodiments, video frames can be extracted from the video and analyzed for features and objects. A similarity measurement can be made between the video frame features and the associated transcript topic, where the similarity can be on a scale from high to low. If the similarity measure between the video frame and the transcript is low, the video segment and the associated transcript text can be discarded as a moment candidate. The video moments can be greater than five minutes.

In various embodiments, an image encoder and a text encoder, for example, an automatic annotation component and/or video search component, can be used to predict the correct pairings of image and text from training examples. The image encoder and text encoder can be used to predict which text as a whole is paired with which video frame features. In various embodiments, a text encoder can be a generic large language model pre-trained on text-only corpora, or a custom-trained text encoder.

In various embodiments, an automatic method can be used to extract a condensed version of the relevant information from the transcript associated with a video segment. GPT3 can be used to obtain the query for each generated video segment. In cases where the segment transcript is too long to be processed by GPT3, a final query can be generated from the concatenation of several splits of the transcript, each processed by GPT3 independently.

In various embodiments, the NLP can be a transformer type natural language processor/neural language model (e.g., GPT), an encoder based natural language processor (e.g., Bidirectional Encoder Representations from Transformers (BERT), Robustly Optimized BERT (RoBERTa)), or other encoder/decoder based NLP.

A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes an attention mechanism, where the attention looks at an input sequence and decides at each step which other parts of the sequence are important.

The attention mechanism involves query, keys, and values denoted by Q, K, and V, respectively. Q is a matrix that contains the query (vector representation of one word in the sequence), K represents all the keys (vector representations of all the words in the sequence), and V is the values, which is the vector representations of all the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights, a.

At operation 470, the video segment starting time of $f_i$ and finishing time of $f_j$ can be presented to a user based on a determination that the video segment is relevant to a query. In various embodiments, the video segment starting at $f_i$ and finishing at $f_j$ can be provided to the user for viewing.

In various embodiments, the video can be temporally segmented according to topics identified in the video transcript. The temporal video segmentation can split the whole video into smaller sub-videos based on the semantic content.

In various embodiments, a deep learning model, for example, a Multi-Source Chunk and Stride Fusion (MCSF) model, can be used for unsupervised summarization of the video, where the video summarization can generate a compact and representative visual summary of a long video.

In various embodiments, frames of the long videos can be subsampled at the rate of two frames per second, and features are extracted from each of the frames using a visual encoder model. The input features can be fused in an early, intermediate, or late stage of the summarization processing pipeline. The output can be summed up based on the difference attention. A temporal grouping of scenes can be based on an arbitrary set of features computed from the long video.

In various embodiments, the video can be temporally segmented according to the timings generated by the automatic speech recognition tool. Due to the high cost of collecting the annotations, the training set can be annotated automatically using the generated transcript together with pretrained large language models. An average length of the transcript can be around 1500 sentences depending on the length of the video and the amount of talking done by the presenter.

In various embodiments, an automatic method to extract a condensed version of the relevant information from the transcript associated with a video segment can be used for query generation. The sentences from the transcript that span the start and end time of a segment proposal can be concatenated and fed to a large language model (e.g., GPT3, Bloom175B, etc.) along with the instructions to summarize the text. The large language model can perform a summarization and information extraction from the transcript text to obtain the query for each generated segment. In cases where the segment transcript is too long to be processed, the final query can be the concatenation of several splits of the transcript, each processed by the large language model (e.g., GPT3, Bloom175B, etc.) independently.

In various embodiments, the video can be temporally segmented using an unsupervised method, for example, optimal normalized grouping (ONG).

Figure 5:
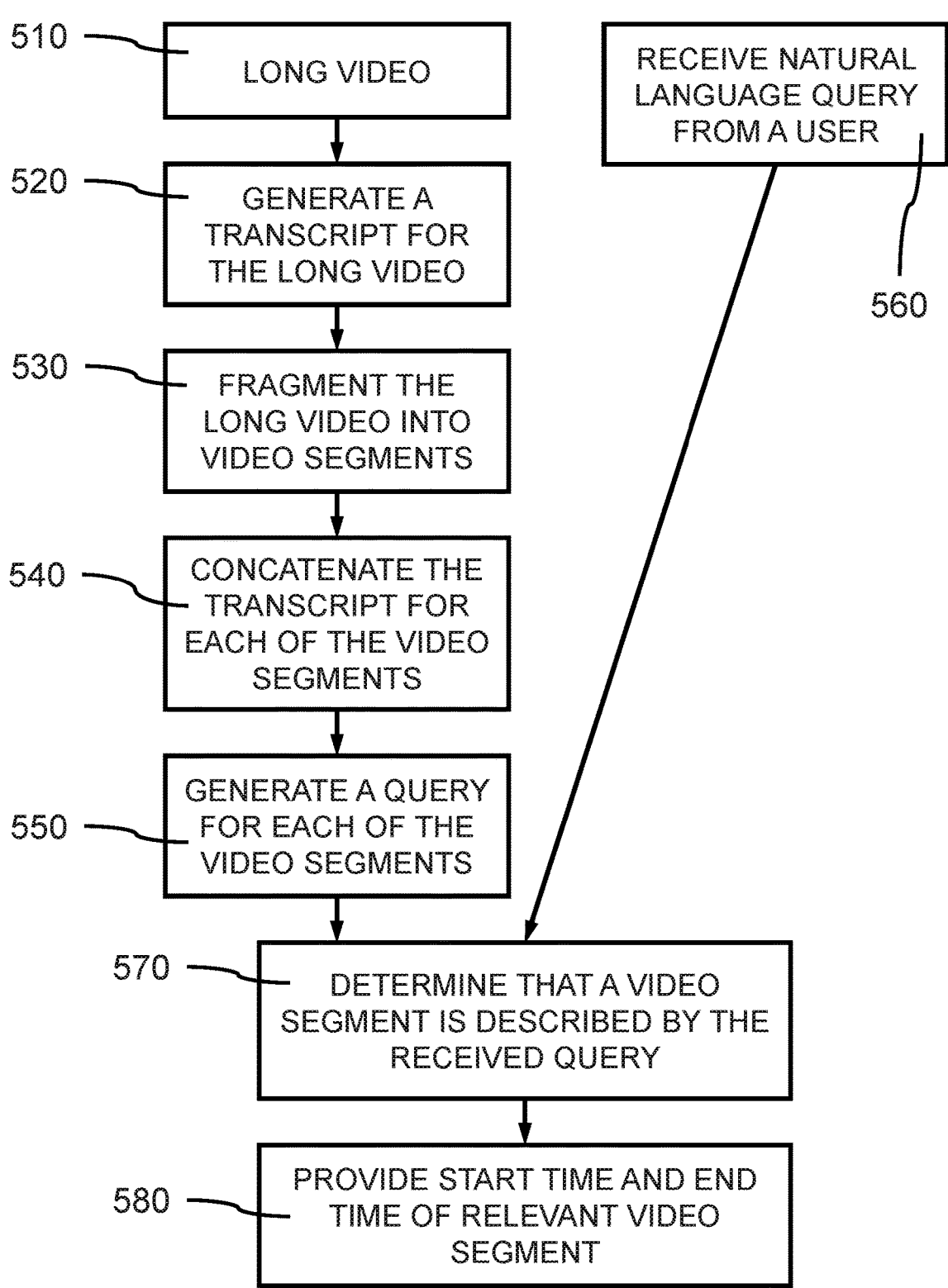
FIG. 5 shows a block/flow diagram illustrating an example of a method of video moment detection, according to aspects of the present disclosure.

FIG. 5 shows a block/flow diagram illustrating an example of a method of video moment detection, according to aspects of the present disclosure.

At operation 510, a long video may be obtained. The long video may be input to a video search model trained to identify one or more video segments relating to a user query. In various embodiments, the long video may be from the Behance platform or YouTube, where the long video can have a playing time of one hour or longer.

At operation 520, a transcript can be generated for the long video, where the transcript can be generated by an automatic speech recognition (ASR) component, where the transcript can be generated from the audio track of the long video. In various embodiments, the ASR component can be an Azure ASR model. In a non-limiting exemplary embodiment, each transcript contains about 1500 sentences.

At operation 530, the long video can be fragmented into video segments, where the video segments can be non-overlapping video segments, such that the end time of an earlier video segment also marks the start time of a subsequent video segment.

In various embodiments, after having the timings for the video segments, the corresponding transcript can be identified and used for that timespan, where the transcript portion for the corresponding timespan can be summarize and information extracted.

At operation 540, the transcript portions can be concatenated for the video segment, where the transcript portions can be concatenated to form a transcript segment associated with the video segment.

At operation 550, a query can be generated for the video segment from the concatenated transcript segment, where the query can be a form of the transcript segment including a plurality of sentences spanning the video segment.

At operation 560, a natural language query can be received from a user, where the user query requests a video segment relevant to a description in the query.

At operation 570, the queries associated with the video segments can be compared to the user query to identify a relevant video segment. The video segments of the long video, for example, may be ranked to identify the most relevant video segment.

At operation 580, the start and end times of the relevant video segment can be provided to the user in response to the user query. In various embodiments, the relevant video segment can be extracted from a long video and provided to the user in response to the user query.

Embodiments of the disclosure can utilize an artificial neural network (ANN), which is a hardware and/or a software component that includes a number of connected nodes (i.e., artificial neurons), which loosely correspond to the neurons in a human brain. Each connection, or edge, transmits a signal from one node to another (like the physical synapses in a brain). When a node receives a signal, the nodes processes the signal and then transmits the processed signal to other connected nodes. In some cases, the signals between nodes comprise real numbers, and the output of each node is computed by a function of the sum of the node's inputs. In some examples, nodes may determine their output using other mathematical algorithms (e.g., selecting the max from the inputs as the output) or other suitable algorithms for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the layer's inputs. The initial layer is known as the input layer and the last layer is known as the output layer. In some cases, signals traverse certain layers multiple times.

Figure 6:
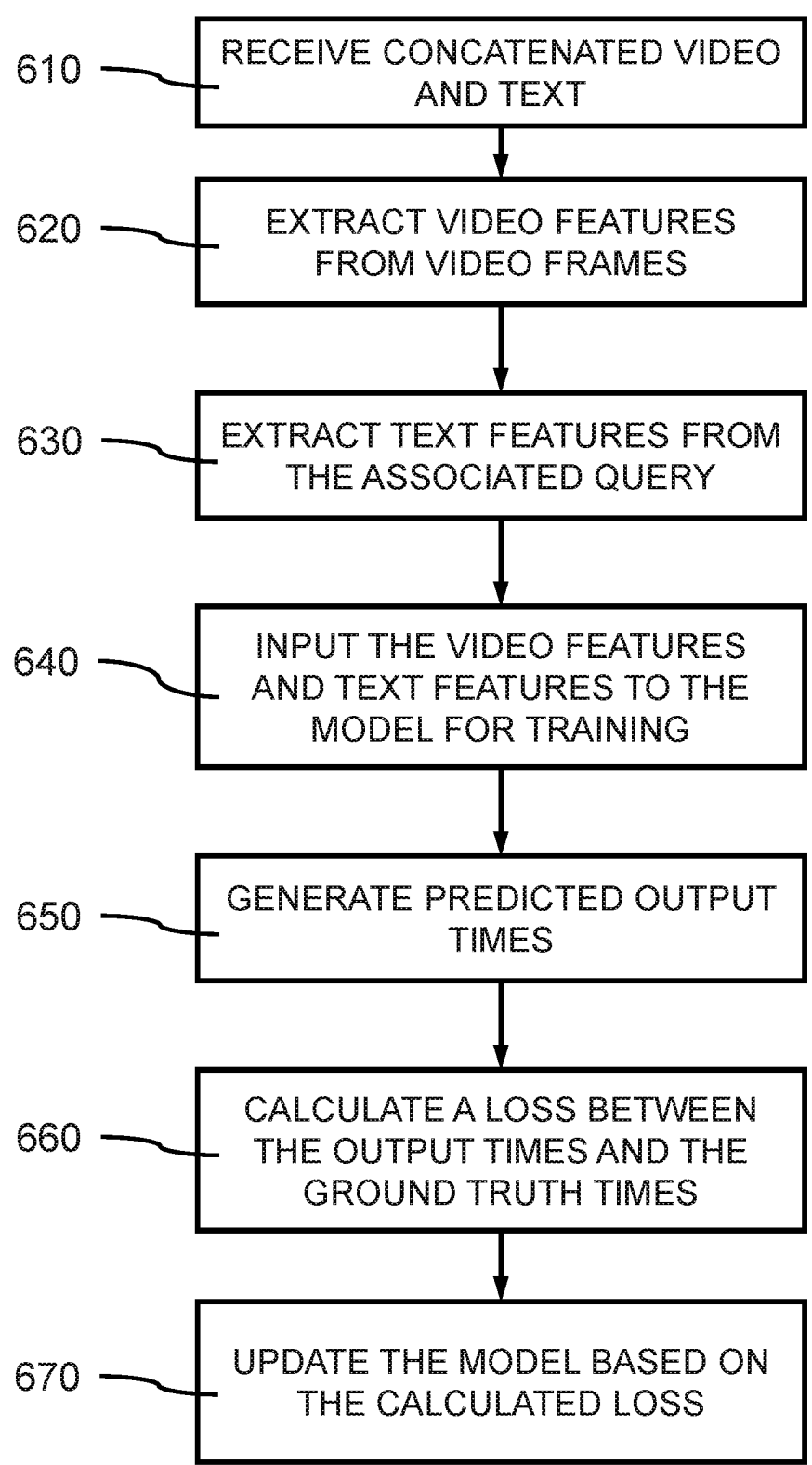
FIG. 6 shows a block/flow diagram of an example of a method of training an automatic annotation component model, according to aspects of the present disclosure.

FIG. 6 shows a block/flow diagram of an example of a method of training an automatic annotation component model, according to aspects of the present disclosure.

At operation 610, a model to be trained can receive concatenated video and text, where a long video has been annotated to identify features in the video frames and scenes in video segments, where a scene can be a feature occurring in a sequence of video frames within the same context. The concatenated videos and text can form a training set including ground truth results for comparison to outputs predicted by the model.

At operation 620, video features may be extracted from the video frames of the long videos.

At operation 630, text features can be extracted from the text of the query associated with the video frames of a video segment of the long video. The text features can be extracted based on a semantic evaluation using a natural language processor model.

At operation 640, the video features and the text features can be input to the model for training.

At operation 650, start and end times can be predicted for the segments of the long video based on the text features and the video features.

At operation 660, a loss value can be calculated based on the difference between the start and end times output by the model and the ground truth times provided with the training set including the concatenated videos and text. The loss value can be calculated based on a loss function, where the loss function may be selected based on efficient convergence of the model.

At operation 670, the model can be updated based on the calculated loss from a loss function. The parameters of the video search model can be updated based on a loss value generated by a loss function, where the parameters can be adjusted to more accurately predict the video segments based on start and end times in response to a query by reducing the loss value.

Example Algorithm for Filtered Long Moment Determination:

```
 1:   Phase 1: generateMomentAnnotations(D) → A
 2:   A = Ø
 3:   for video vₗ in D do
 4:       Generate transcript sₗ for vₗ
 5:       Tₗ = randomSegmentsGeneration(vₗ)
 6:       Aₗ = Ø
 7:       for timing (iₖ, jₖ) ∈ Tₗ do
 8:           qk = concatenateTranscript((ik, jk), sl)
 9:           Add (qk, (ik, jk)) to Al
10:       end for
11:       A = A ∪ Aₗ
12:   end for
13:   Phase 2: filter(A, D, thr) → A_filtered
14:   A_filtered = Ø
15:   for qₖ, (iₖ, jₖ) ∈ A do
16:       sents = splitSentences(qₖ)
17:       frames_emb = extractV CLIP(D, iₖ, jₖ)
18:       sentences_emb = extract CLIP(sents)
19:       sims = sentences_emb × frames_emb.T
20:       max_sim = max(sims)
21:       if max_sims > thr then
22:           A_filtered = A_filtered ∪ (qₖ, (iₖ, jₖ))
23:       end if
24:   end for
25:   Phase 3: Train the final model, M
26:   for minibatch of paired samples (v, a), a = (qₖ, (iₖ, jₖ)) ∈
        A_filtered, v ∈ D do
27:       Extract video features x from v
28:       Extract text features pₖ from qₖ
29:       Feed x and qₖ to M and get output o.
30:       Compute the loss between o and (iₖ, jₖ).
31:       Update M base on loss
32:   end for
```

FIG. 7 shows a flow diagram of a method of training a long video annotator, according to aspects of the present disclosure.

At operation 710, automatically annotated long videos can be received, as a training set, by an annotation component model, where the annotation component model is to be trained for an automatic annotation process of subsequent long videos.

At operation 720, a transcript can be generated for the long videos in the training set, where the transcript can be used to train annotation.

At operation 730, text features can be extracted from the generated transcript. Video features can be extracted from the video frames. The text features and video features can be used for matching video segments with transcript segments.

At operation 740, the video features and text features can be input to the annotation component model.

At operation 750, the video segments and text segments can be filtered based on a similarity measurement.

At operation 760, the start and end times can be predicted for video segments and associated transcript segment can be predicted for the associated video segments.

At operation 770, a loss can be calculated between the predicted annotations and ground truth annotations, and the parameters of the annotation component model updated to improve performance of the annotation component model.

Figure 8:
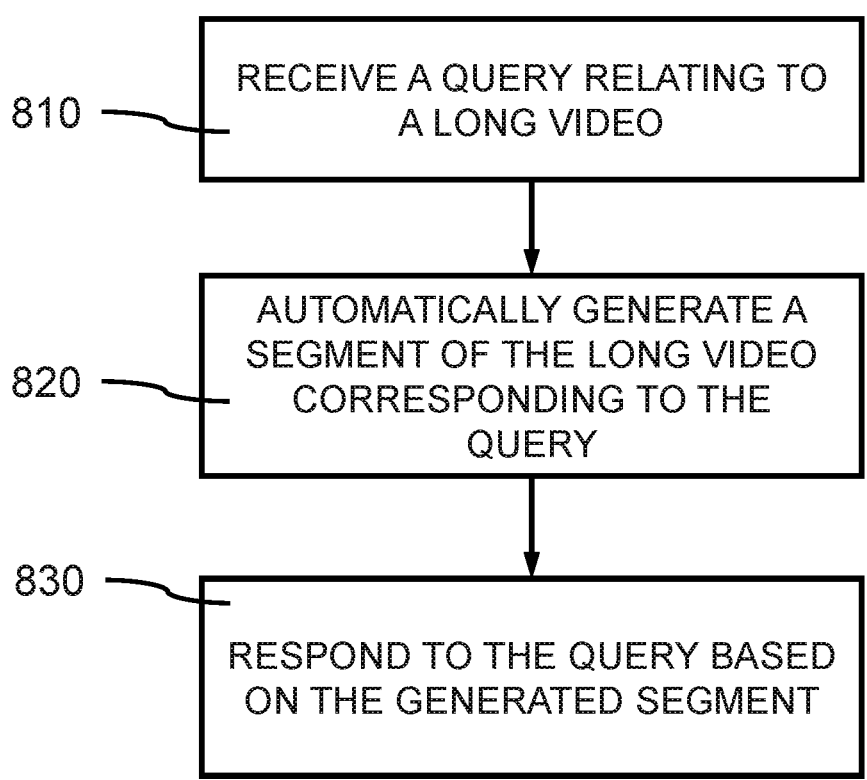
FIG. 8 shows a block/flow diagram of an example of a method of video segment identification, according to aspects of the present disclosure.

FIG. 8 shows a block/flow diagram of an example of a method of video segment identification, according to aspects of the present disclosure.

At operation 810, a query relating to a long video can be received by a video search model.

At operation 820, a segment of the long video corresponding to a user query can be generated.

At operation 830, a response to the user query based on the generated segment can be communicated to the user.

Figure 9:
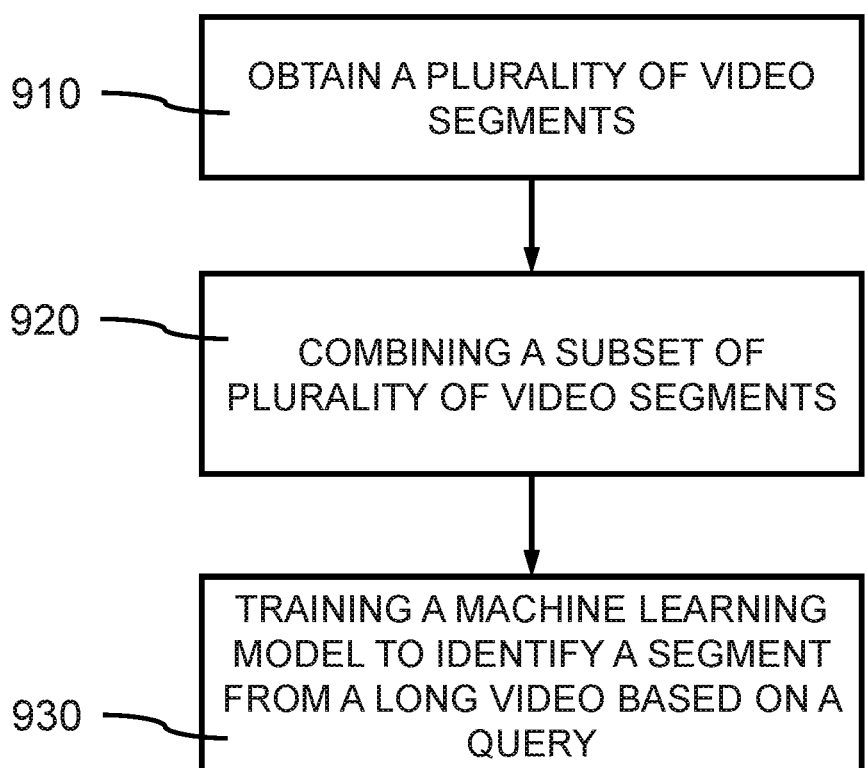
FIG. 9 shows a block/flow diagram of an example of a method of training a video segment identification model, according to aspects of the present disclosure.

FIG. 9 shows a block/flow diagram of an example of a method of training a video segment identification model, according to aspects of the present disclosure.

At operation 910, a plurality of video segments can be obtained by a video search model.

At operation 920, a subset of the plurality of video segments can be combined by a video search model.

At operation 930, the video search model can be trained to identify a video segment from a long video based on a query.

Embodiments can utilize a word embedding model to encode a text prompt. A word embedding is a learned representation for text where words that have the same meaning have a similar representation. Glove, Word2Vec, GPT, BERT, and CLIP are examples of systems for obtaining a vector representation of words. GloVe is an unsupervised algorithm for training a network using aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the vector space. Word vectors are positioned in the vector space in a manner such that similar words are located nearby in the vector space. In some cases, an embedding space may include syntactic or context information in addition to semantic information for individual words.

In a non-limiting exemplary embodiment, the model is trained in PyTorch, using the AdamW optimizer with a learning rate of $1e^{-4}$ and a weight decay of $1e^{-4}$. Due to memory limitations, the model was trained with a batch size of 16. The validation and testing splits are annotated by humans, while the training split is automatically annotated. The videos represent source materials that teach skills for educational purposes. The data was collected according to the CVPR guidelines and ethics standards.

In various embodiments, annotators watch the tutorial videos, segment each video into high-level chapters, and write a natural language description for each segment. The natural language description is a brief summary of what happens in the video segment that contains no more than a few sentences.

Figure 10:
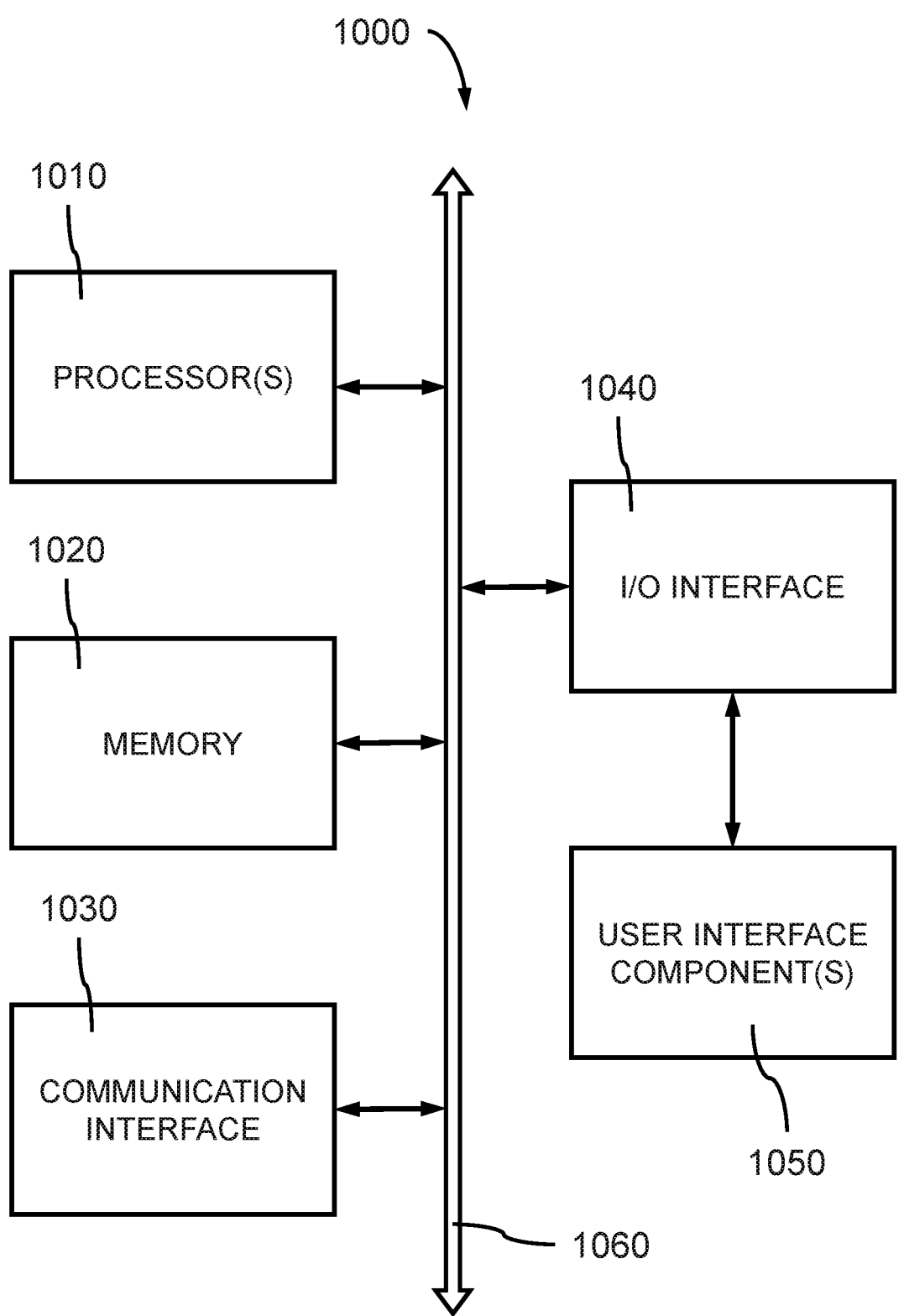
FIG. 10 shows an example of a computing device for a video segment identification system according to aspects of the present disclosure.

FIG. 10 shows an example of a computing device for a video segment identification system according to aspects of the present disclosure.

In various embodiments, the computing device 1000 includes processor(s) 1010, memory subsystem 1020, communication interface 1030, I/O interface 1040, user interface component(s) 1050, and channel 1060.

In various embodiments, computing device 1000 is an example of, or includes aspects of video segment identification system 130. In some embodiments, computing device 1400 includes one or more processors 1410 that can execute instructions stored in memory subsystem 1420 for video segment identification and video search model training.

In various embodiments, computing device 1000 includes one or more processors 1010. In various embodiments, processor 1010 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1010 is configured to operate a memory array using a memory controller. In other cases, a memory controller is integrated into a processor. In some cases, a processor is configured to execute computer-readable instructions stored in a memory to perform various functions. In some embodiments, a processor 1010 includes special-purpose components for modem processing, baseband processing, digital signal processing, or transmission processing.

A processor 1010 may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor 1010, the functions may be stored in the form of instructions or code on a computer-readable medium.

In various embodiments, memory subsystem 1020 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor 1010 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1030 operates at a boundary between communicating entities (such as computing device 1000, one or more user devices, a cloud, and one or more databases) and channel 1060 (e.g., bus), and can record and process communications. In some cases, communication interface 1030 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1040 is controlled by an I/O controller to manage input and output signals for computing device 1000. In some cases, I/O interface 1040 manages peripherals not integrated into computing device 1000. In some cases, I/O interface 1040 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

According to some aspects, user interface component(s) 1050 enable a user to interact with computing device 1000. In some cases, user interface component(s) 1050 include an audio device, such as an external speaker system, an external display device such as a display device 290 (e.g., screen), an input device (e.g., a remote-control device interfaced with a user interface directly or through the I/O controller), or a combination thereof. In some cases, user interface component(s) 1050 include a GUI.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a query relating to a long video;
encoding the query to obtain an encoded query;
encoding a plurality of segments of the long video to obtain a plurality of encoded segments;
generating a segment of the long video corresponding to the query using a machine learning model by comparing the encoded query to each of the plurality of encoded segments, wherein the machine learning model is trained to identify relevant segments from long videos based on input comprising encoded text features and encoded video features; and
responding to the query based on the generated segment.

2. The method of claim 1, wherein:
the machine learning model is trained based on training data including long segments formed by combining multiple video segments.

3. The method of claim 1, wherein:
the generated segment comprises a long segment.

4. The method of claim 1, wherein:
the segment comprises a start time and an end time within the long video.

5. The method of claim 1, wherein:
the segment comprises a center time and a segment length.

6. A system comprising:
one or more processors;
one or more memories including instructions executable by the one or more processors to:
encode a query to obtain an encoded query, wherein the query relates to a long video;
encode a plurality of segments of the long video to obtain a plurality of encoded segments; and
generate a segment of the long video corresponding to the query based on a machine learning model by comparing the encoded query to each of the plurality of encoded segments, wherein the machine learning model is trained to identify relevant segments from long videos based on input comprising encoded text features and encoded video features.

7. The system of claim 6, wherein:
the machine learning model is trained based on training data including long segments formed by combining multiple video segments.

8. The system of claim 7, wherein:
the training data is filtered based on a relevancy filter.

9. The system of claim 6, further comprising:

a multi-modal encoder configured to encode text input and video input.

10. The system of claim 6, wherein:

the machine learning model includes a transformer encoder and a transformer decoder.

11. The system of claim 6, further comprising:

a user interface configured to receive the query from a user and to provide a response to the user based on the generated segment.

12. A non-transitory computer readable medium storing code for image processing, the code comprising instructions that, when executed by at least one processor, cause the at least one processor to perform operations comprising:

receiving a query relating to a long video;

encoding the query to obtain an encoded query;

encoding a plurality of segments of the long video to obtain a plurality of encoded segments;

generating a segment of the long video corresponding to the query using a machine learning model by comparing the encoded query to each of the plurality of encoded segments, wherein the machine learning model is trained to identify relevant segments from long videos based on input comprising encoded text features and encoded video features; and responding to the query based on the generated segment.

13. The non-transitory computer readable medium of claim 12, wherein:

the machine learning model is trained based on training data including long segments formed by combining multiple video segments.

14. The non-transitory computer readable medium of claim 13, wherein:

the training data is filtered based on a relevancy filter.

15. The non-transitory computer readable medium of claim 12, wherein:

the generated segment comprises a long segment.

16. The non-transitory computer readable medium of claim 12, wherein:

the segment comprises a start time and an end time within the long video.

17. The non-transitory computer readable medium of claim 12, wherein:

the segment comprises a center time and a segment length.

* * * * *